United States Patent
Pfister et al.

(10) Patent No.: US 10,536,561 B2
(45) Date of Patent: Jan. 14, 2020

(54) DATA STREAM PIPELINING AND REPLICATION AT A DELIVERY NODE OF A CONTENT DELIVERY NETWORK

(71) Applicant: Cisco Technology, Inc., San Jose, CA (US)

(72) Inventors: Pierre Pfister, Angers (FR); William Mark Townsley, Paris (FR); Yoann Louis Simon Desmouceaux, Paris (FR); Guillaume Michel Ruty, Paris (FR)

(73) Assignee: Cisco Technology, Inc., San Jose, CA (US)

( * ) Notice: Subject to any disclaimer, the term of this patent is extended or adjusted under 35 U.S.C. 154(b) by 117 days.

(21) Appl. No.: 15/784,361

(22) Filed: Oct. 16, 2017

(65) Prior Publication Data
US 2019/0116246 A1    Apr. 18, 2019

(51) Int. Cl.
*H04L 29/06*    (2006.01)
*G06F 13/28*    (2006.01)
(Continued)

(52) U.S. Cl.
CPC ............ *H04L 69/161* (2013.01); *G06F 3/065* (2013.01); *G06F 3/0619* (2013.01);
(Continued)

(58) Field of Classification Search
None
See application file for complete search history.

(56) References Cited

U.S. PATENT DOCUMENTS 7,403,974 B1    7/2008 Harris
7,496,699 B2    2/2009 Pope et al.
(Continued)

OTHER PUBLICATIONS

GitHub, "ANS (Accelerated Network Stack) on DPDK, DPDK Native TCP/IP Stack," retrieved from https://github.com/ansyun/dpdk-ans, on Jul. 27, 2017, 7 pages.
(Continued)

*Primary Examiner* — Jeffrey R Swearingen
(74) *Attorney, Agent, or Firm* — Edell, Shapiro & Finnan, LLC

(57) ABSTRACT

A content delivery node receives data packets carrying content from an upstream source of content, and writes segments of the received content directly to a memory buffer of a memory using direct memory access (DMA) data transfers. The node derives, for each segment, respective segment-specific metadata based on contents of the segment, and stores the respective segment-specific metadata in the memory. The node receives from multiple downstream client devices respective requests for the same content. Each request includes client-specific information. Responsive to the requests, the node: identifies one or more segments that satisfy the requests; generates, for each client device, client-specific metadata using the client-specific information and the segment-specific metadata for the one or more segments; constructs, for each client, a client-specific data packet that includes the one or more segments and the client-specific metadata; and transmits the client-specific data packets to the downstream client devices.

20 Claims, 7 Drawing Sheets

(51) Int. Cl.
*G06F 3/06* (2006.01)
*G06F 13/42* (2006.01)
*H04L 29/08* (2006.01)

(52) U.S. Cl.
CPC .......... *G06F 3/0656* (2013.01); *G06F 3/0688* (2013.01); *G06F 13/28* (2013.01); *G06F 13/4282* (2013.01); *H04L 67/327* (2013.01); *H04L 69/324* (2013.01); *G06F 2213/0026* (2013.01)

(56) References Cited

U.S. PATENT DOCUMENTS

| | | |
|---|---|---|
| 9,092,426 B1 | 7/2015 | Bathija et al. |
| 2011/0138064 A1* | 6/2011 | Rieger ............ H04N 21/25816 709/228 |
| 2012/0317360 A1 | 12/2012 | Zettler et al. |
| 2017/0295226 A1* | 10/2017 | Basta ................. H04L 67/1042 |
| 2017/0353768 A1* | 12/2017 | Muvavarirwa .... H04N 21/2181 |

OTHER PUBLICATIONS

GitHub, "mTCP: A Highly Scalable User-Level TCP Stack for Multicore Systems," retrieved from https://github.com/eunyoung14/mtcp, on Jul. 27, 2017, 6 pages.

\* cited by examiner

DATA STREAM PIPELINING AND REPLICATION AT A DELIVERY NODE OF A CONTENT DELIVERY NETWORK

TECHNICAL FIELD

The present disclosure relates to efficient content delivery in content delivery networks.

BACKGROUND

Content delivery networks deliver content to many clients over layered networks. While traditional network stacks in such networks permit use of generic application specification interfaces (APIs), the network stacks introduce data handling inefficiencies. For example, generic Transmission Control Protocol (TCP) stacks copy data buffers (i.e., data) from applications to TCP-specific memory areas for use by an Internet Protocol (IP) layer in which another memory copy, a checksum calculation, and other operations occur. Similarly, applications retrieving data from remote filesystems for delivery over Hypertext Transfer Protocol (HTTP) also perform a large number of memory copies, buffering, and data indirections. When an application generates content responses for many clients, or when the content does not fit into local memory of distribution/delivery nodes, duplicative memory copies may occur.

DESCRIPTION OF EXAMPLE EMBODIMENTS

Overview

In a content delivery network, a content delivery node receives data packets carrying content from an upstream source of content, and writes segments of the received content directly to a memory buffer of a memory of the content delivery node using direct memory access (DMA) data transfers. The content delivery node derives, for each segment, respective segment-specific metadata based on contents of the segment, and stores the respective segment-specific metadata in the memory. The content delivery node receives from multiple downstream client devices respective requests for the same content. Each request includes client-specific information associated with the downstream client device that originated the request. Responsive to the requests, the content delivery node: identifies in the memory buffer one or more segments that satisfy the requests; generates, for each client, client-specific metadata using the client-specific information for the client device and the segment-specific metadata for the one or more segments; and constructs, for each client device, a client-specific data packet that includes the one or more segments and the client-specific metadata, such that the client-specific data packet reuses (i) the same segment-specific metadata associated with the one or more segments across all of the client-specific data packets so as to avoid re-deriving the segment-specific metadata, and (ii) the same one or more segments across all of the client-specific data packets to avoid copying the one or more segments. The content delivery node transmits the client-specific data packets to the downstream client devices.

Example Embodiments

Figure 1:
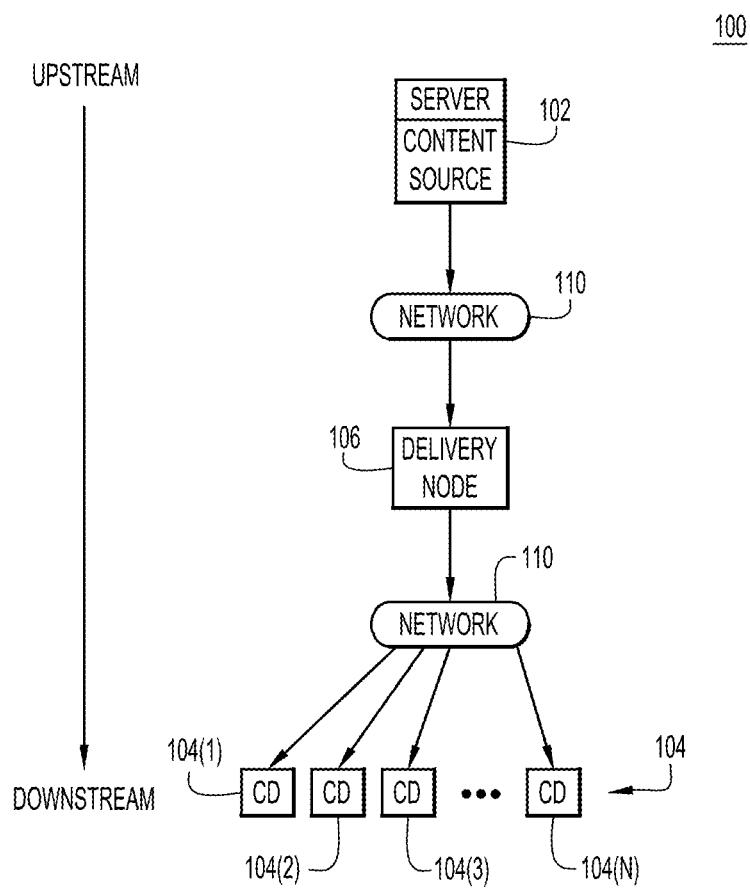
FIG. 1 there is a block diagram of a first content delivery network (CDN) in which embodiments directed to data/content stream pipelining and replication may be implemented, according to an example embodiment.

Referring first to FIG. 1, there is shown a block diagram of a first content delivery network (CDN) 100 in which embodiments directed to data/content stream pipelining and replication may be implemented. CDN 100 includes a source of content 102 (also referred to as a "data source" or "content source") that stores content, multiple client devices (CDs) 104(1)-104(N) (also referred to simply as "clients") operated by users (not shown), a delivery node 106 to deliver/distribute the content from the content source to the client devices, and a communication network 110 connected to the content source, the delivery node, and the client devices, and over which the aforementioned devices/services communicate with each other. Communication network 110 may include one or more local area networks (LANs), and one or more wide area networks (WANs), such as the Internet. CDN 100 associates content source 102 and client devices 104 with upstream and downstream ends/sides of the CDN, respectively. Thus, downstream flow flows in a direction from content source 102 to client devices 104, and upstream flow flows in a direction form the client devices to the content source. Although the example of FIG. 1 shows only one content server and one delivery node, it is understood that the CDN typically includes many geographically distributed content servers and delivery nodes in order to place the delivery nodes near to the client devices.

Content source 102 may include a content server (referred to as an "origin server") associated with a content service and that stores a variety of content in the form of files indexed to support streaming of the files to client devices 104 through delivery node 106, for example. Such content may include, but is not limited to, video content, audio content, audio-visual content, text content, multimedia content, and the like. Example content services include YouTube, Netflix®, HBO®, and the like. Delivery node 106 may include a computer device, such as a server, proxy server, or caching server, for example, configured to implement the embodiments presented herein. Delivery node 106 may support a variety of different protocols such as, but not limited to, Ethernet protocols, TCP/IP, HTTP (e.g., HTTP on TCP/IP on Ethernet), Quick User Data Datagram Protocol (UDP) Internet Connections (QUIC), and the like. Content source 102 and delivery node 106 may communicate with each other, e.g., exchange data packets with each other, over network 110 using one or more different communication protocols, including, but not limited to, the aforementioned communication protocols.

Client devices 104 may take on a variety of forms, including televisions, SmartPhones, tablets, laptop computers, desktop computers, video conference endpoints, and the like. Client devices 104 request and receive content from content source 102 through network 110 and delivery node 106. Client devices 104 and delivery node 106 may communicate with each other, e.g., exchange data packets with each other, over network 110 using one or more different communication protocols, including Ethernet protocols, TCP/IP, and the like.

At a high level, client devices 104 request content from content source 102 via delivery node 106. That is, delivery node 106 receives requests for content from content sources 102. If delivery node 106 has the content stored in a local cache of the delivery node as a result of servicing previous requests for the content, the delivery node sends the requested content from the local cache to the client devices. Otherwise, delivery node 106 forwards the requests for content to content source 104, receives the requested content from the content source, and forwards the received, requested content to the client devices. As such, delivery node 106 may support multicasting to client devices 104, simulcasting to the client devices, and simultaneous streaming to the client devices. Also, at any given time, delivery node 106 may receive requests for the same content from multiple ones of client devices 104, and thus transmits the same content to those client devices. As will be described below, when multiple client devices send requests for the same content, delivery node 106 performs "re-use" operations to satisfy the requests efficiently, in accordance with embodiments presented herein. The operations performed by delivery node 106 in accordance with the embodiments are collectively referred to as "data/content stream pipelining and replication" operations.

Figure 2:
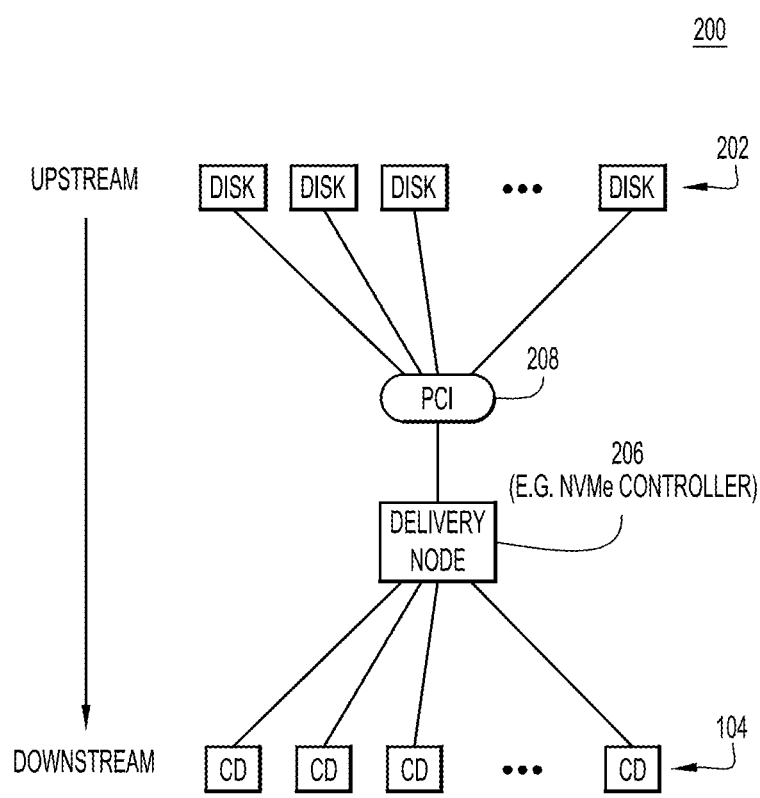
FIG. 2 there is a block diagram of a second CDN in which embodiments directed to data/content stream pipelining and replication may be implemented, according to an example embodiment.

Referring first to FIG. 2, there is shown a block diagram of a second content delivery network 200 in which embodiments presented herein may be implemented. CDN 200 employs components based on non-volatile memory express (NVMe) and peripheral component interconnect (PCI) express (PCIe) technology, or a similar technology, to store and deliver content. For example, CDN 200 includes multiple disks 202 to store content similar to that described in connection with FIG. 1, a delivery node 206 implemented as an NVMe controller, a PCIe bus 208 connecting the disks to the controller and over which the controller access content from the disks, and client devices 104. Client devices 104 and delivery node/controller 206 may communicate with each other over communication network 110, for example. Controller 206 operates similarly to server 106 to deliver content from disks to client devices 104

At a high level, in either CDN 100 or CDN 200, when a given client device 104(i) desires specific content, the client device sends a request for the content to delivery node 106. Delivery node 106 determines whether the requested content is already stored in a memory or a cache of the delivery node, i.e., whether the delivery node can satisfy the request using the cache. If so, delivery node 106 retrieves the requested content from the cache and delivers the retrieved, requested content to the client device, thus satisfying the request. On the other hand, if the specific content is not already cached, delivery node 106 forwards the request to content store 102, which accesses the requested content from memory in the content store, and then sends the requested content to delivery node 106. In turn, delivery node 106 stores the specific content received from content store 102 in the cache of the delivery node so that the cache can satisfy a subsequent request for the requested content, and sends the requested content to client device (i), thus satisfying the request; the requested content, now stored in the cache, is thus available for subsequent requests for that content from any of client devices 104.

Figure 3:
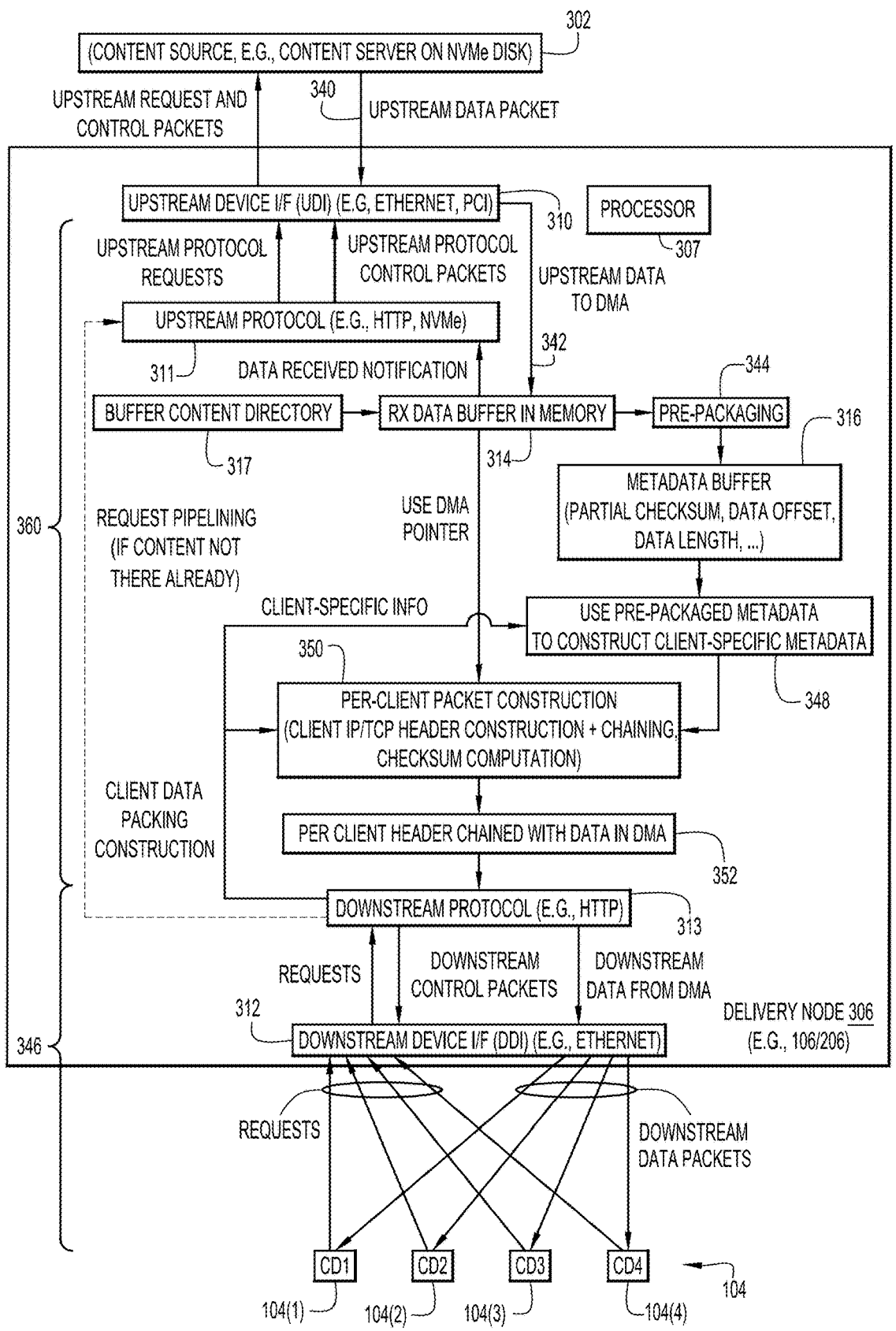
FIG. 3 is a combined block diagram and flowchart that shows data/content stream pipelining and replication operations performed in the CDNs, according to an example embodiment.

With reference to FIG. 3, there is a combined block diagram and flowchart that shows data/content stream pipelining and replication operations performed in CDNs 100 and 200 in accordance with embodiments presented herein. At the top of FIG. 3, there is shown a content source 302, which may include content server 102 or one or more of NVMe disks 202. In the middle of FIG. 3, there is shown a delivery node 306, which may include server 106 or NVMe controller 206. At the bottom of FIG. 3, there are shown client devices 104(1)-104(4), each also referred to as a "downstream client."

Figure 6:
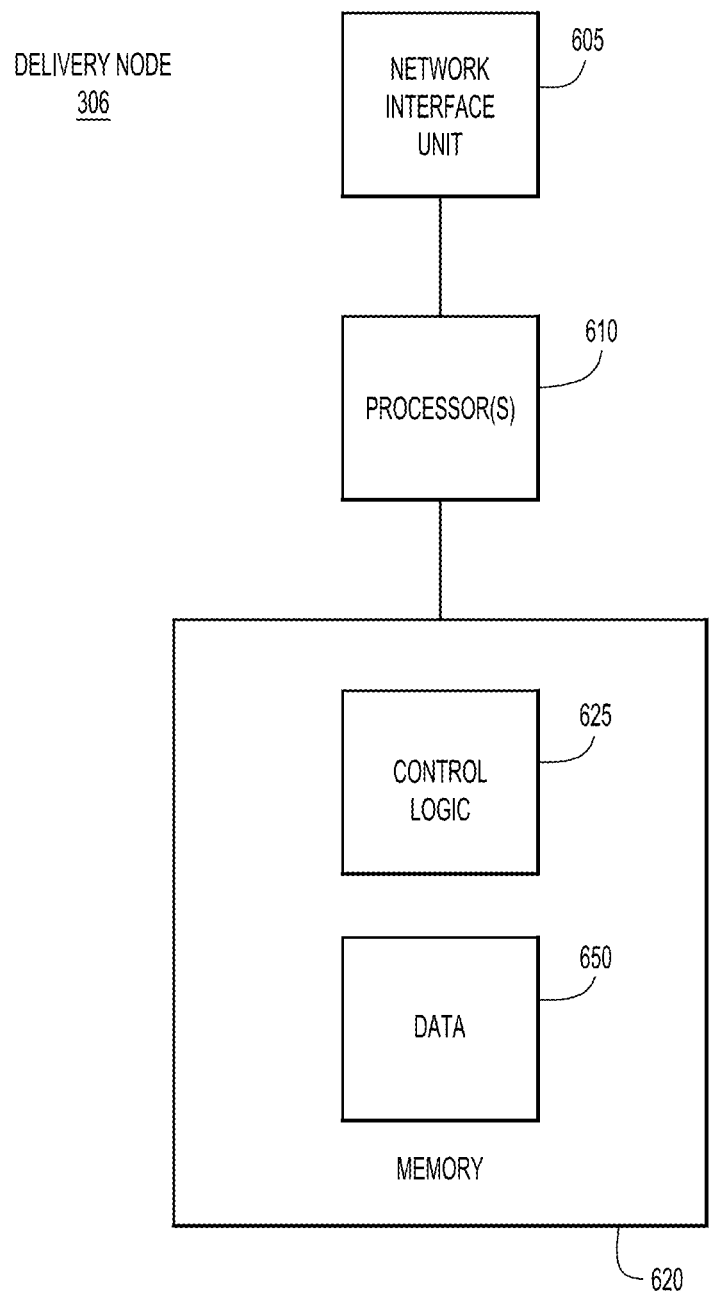
FIG. 6 is a hardware block diagram of the delivery node, according to an example embodiment.

Delivery node 306 includes a processor 307 and a main memory (not specifically shown in FIG. 3, but which is shown in FIG. 6, described below), an upstream device interface (I/F) (UDI) 310 that cooperates with an upstream protocol layer (UPL) 311 to communicate bi-directionally (e.g., exchange data packets) with content source 302, and a downstream device interface (DDI) 312 that cooperates with a downstream protocol layer (DPL) 313 to communicate bi-directionally (e.g., exchange data packets) with client devices 104. Delivery node 306 also includes a receive (RX) data buffer 314 (also referred to simply as a "memory buffer" or "cache") to hold data/content segments contained in data packets received from content source 302 via upstream data interface 310, a metadata buffer 316 in the main memory to hold metadata specific to each of the segments stored in the RX data buffer (i.e., to store segment-specific metadata), and a buffer content directory 317 that stores a respective identifier of and a pointer to each segment stored in the RX data buffer. The main memory may also include a transmit (TX) data buffer (not shown in FIG. 3) to store client-specific data packets to be transmitted to client devices 104 via downstream protocol layer 313 and downstream data interface 312.

Operations 340-360 performed by delivery node 306 in support of data/content stream pipelining and replication are now described.

Starting at the top right-side of FIG. 3, at 340, upstream device interface 310 receives from content server 302 data packets including/carrying content stored on the content server. The data packets are each referred to as an "upstream data packet" in FIG. 3. Each data packet may include a content identifier, such as an HTTP Uniform Resource Locator (URI) and/or one or more content indexes to identify a source of the content and successive chunks of the content, as is known in streaming applications, for example.

At 342, a direct memory access (DMA) process in delivery node 306 (i) writes contiguous segments of content contained in each of the received data packets directly into successive portions of RX data buffer 314, (ii) generates a respective segment identifier and a respective DMA pointer pointing to each segment, and (iii) stores the segment identifiers and DMA pointers into buffer content directory 317. Each segment identifier may include the content identifier mentioned above, e.g., the one or more content indexes and possibly the URI. Operation 342 is performed without involving, or independent of, processor 307. Flow proceeds from 342 to 344.

At 344, processor 307 accesses the segments stored in RX data buffer 314 and performs metadata pre-packaging of the (accessed) segments. Specifically, processor 307 generates respective segment-specific metadata for/associated with each segment. To do this, processor 307 derives, for each segment, respective segment-specific metadata based on contents of the segment. The segment-specific metadata derived/determined in operation 344 includes, but is not limited to, a checksum for the segment (referred to as a "partial checksum"), a data offset (i.e., a "segment offset") of the segment within RX data buffer 314, a data length (i.e., a "segment length") of the segment, and the like.

Processor 307 stores the segment-specific metadata for each segment in a respective portion of metadata buffer 316. Processor 307 may associate each segment with its respective segment-specific metadata using a memory pointer between the segment and its respective segment-specific metadata. Alternatively, processor 307 may store the segment-specific metadata in RX data buffer 314 with its associated segment. Alternatively, processor 307 may add to buffer content directory 317 linked pointers to the segment-specific metadata and its associated segment.

Asynchronously with respect to operations 340-344, at 346, downstream device interface 312 receives from client devices 104(1)-104(4) respective ones of requests R for the same content (which is assumed to be stored in content store 302), and downstream protocol layer 313 performs receive protocol processing on the requests. Each request includes an identifier of the same content (i.e., which is the same across all of the requests). For example, the content identifier in each request may specify one or more content indexes and possibly a URI, as mentioned above. Each request also includes unique, client-specific information associated with the client device that originated the request, such as an IP address of the client device, a media access control (MAC) address of the client device, an identifier of a user associated with the client device, and the like. Downstream protocol layer 313 makes the unique, client-specific information in each request available to other operations performed in delivery node 306, as discussed below.

Responsive to the requests from client devices 104, and using the content identifiers (e.g., content indexes and possibly the URI) in the requests, processor 317 (for example, logic included in downstream protocol layer 313) determines whether the same data solicited in the requests is present in RX data buffer 314, i.e., whether one or more segments in the RX data buffer satisfy the requests. To do this, processor 317 may (i) compare the identifier of the same data (from the requests) against contents of buffer content directory 317, and (ii) if there is a match, identify the one or more segments using the contents of the buffer content directory.

Assuming it is determined that one or more segments satisfy the requests, at 348, processor 307 generates/constructs, for each client device that sent a request, client-specific metadata using (i) client-specific information for the client device made available by downstream protocol processing 313 (e.g., a client-specific IP address), and (ii) the segment-specific metadata associated with the one or more segments (e.g., a partial checksum, a segment offset, and/or a segment length for each segment). The client-specific metadata (for each client) constructed at operation 348 may be one or more protocol headers that include the client-specific information, such as an IP and/or TCP header that includes a client-specific IP address. Processing flow proceeds from 348 to 350.

At 350, processor 307 constructs, for each client device that sent a request, a client-specific data packet that includes (i) the client-specific metadata from operation 348 (e.g., the client-specific protocol header), and (ii) the one or more segments from RX data buffer 314 that satisfy the request. Specifically, processor 307 constructs the client-specific data packets such that same segment-specific metadata associated with the same one or more segments included in each of the client-specific data packets is re-used across all of the client-specific data packets. Through such re-use of the same segment-specific metadata and the same one or more segments across all of the client-specific data packets, processor 307 avoids having to re-derive the same segment-specific metadata for each client-specific data packet and avoids having to copy the same one or more segments, which increases processor efficiency. The foregoing implies that a single client request generates/results in a single client-specific data packet (i.e., a single client response packet); however, in practice, each "request" may result from a series of packets (e.g. carrying an HTTP URI and content indexes), and may be answered with a possibly large number of client-specific data packets (i.e., client response packets), which are transmitted to the respective client device according to the downstream protocol (i.e., with the correct timing, and possibly with retransmissions of some client-specific data packets, and the like).

In an example of such re-use of segment-specific metadata across all of the client-specific data packets, processor 307 computes, for each client-specific data packet, a respective total packet checksum (that will be included in the client-specific data packet) over the protocol header and the one or more segments in the client-specific data packet, using the partial checksums associated with the one or more segments. Processor 307 uses the partial checksums in such a way as to avoid re-computing the partial checksums (i.e., that avoids traversing the contents of the one or more segments to compute their respective partial checksums) when computing the total packet checksum. One way to do this is to, for each client-specific data packet, (i) add together the already computed partial checksums for the one or more segments to produce a summed partial checksum (which avoids traversing the contents of each of the one or more segments again to compute the checksums thereof), (ii) compute a checksum over the protocol header or at least over a portion of the protocol header to produce a protocol header checksum, and (iii) add together the summed partial checksum and the protocol header checksum, to produce the total packet checksum. For example, processor 307 may construct a client-specific TCP/IP packet (or HTTP over TCP/IP packet), in which the TCP checksum in the TCP header covers content including the one or more segments carried in the payload of the packet. Therefore, processor 307 may use the partial checksums of the one or more segments to compute the TCP checksum without having to actually re-compute those partial checksums, i.e., the partial checksums are simply "rolled into" the TCP checksum. Any known or hereafter developed technique for computing the checksums may be used, e.g., by performing a one's complement of a one's complement sum of all of the 16-bit words of a data field over which the checksum is being performed.

Flow proceeds from 350 to 352. To achieve further processor efficiency, at 352, processor 307 may take advantage of DMA chaining of the segments stored in RX data buffer 314. That is, to construct each client-specific data packet, processor 307 utilizes chaining of the one or more segments in RX data buffer 314 to link the one or more segments together in the client-specific data packet, and then to link the linked one or more segments to the corresponding client-specific header to construct an entire client-specific data packet.

Once constructed, the client-specific data packets are submitted to downstream protocol layer 313. Downstream protocol layer 313 cooperates with downstream interface device 312 to deliver the client-specific data packets (referred to as "downstream data from DMA" and "downstream data packets" in FIG. 3) to their respective client devices, i.e., to deliver the client-specific data packets to respective ones of client devices 104(1)-104(4).

As described above, delivery node 306 performs operations 348, 350, and 352 when the delivery node determines that one or more segments in RX data buffer 314 satisfy the requests for content from client devices 104(1)-104(4). On the other hand, if delivery node 306 determines that such content is not present in RX data buffer 314, the delivery node solicits content store 302 for that content. To do this, at 360 (shown at the middle left-side of FIG. 3), downstream protocol layer 313 forwards the requests for the un-cached content to upstream protocol layer 311. Then, upstream protocol layer 311 cooperates with upstream device interface 310 to forward to content source 302 both the requests from downstream protocol layer 313 and control information from the upstream protocol layer (collectively referred to as "upstream request and control packets," at the top left-side of FIG. 3).

In response to the upstream requests and control packets, content source 302 sends the requested content (referred to as "upstream data packet" at the top right-side of FIG. 3) to delivery node 306. Upstream device interface 310 receives the requested content in the form of data packets and the above-described process repeats, i.e., operations 342-352 repeat.

Figure 4A:
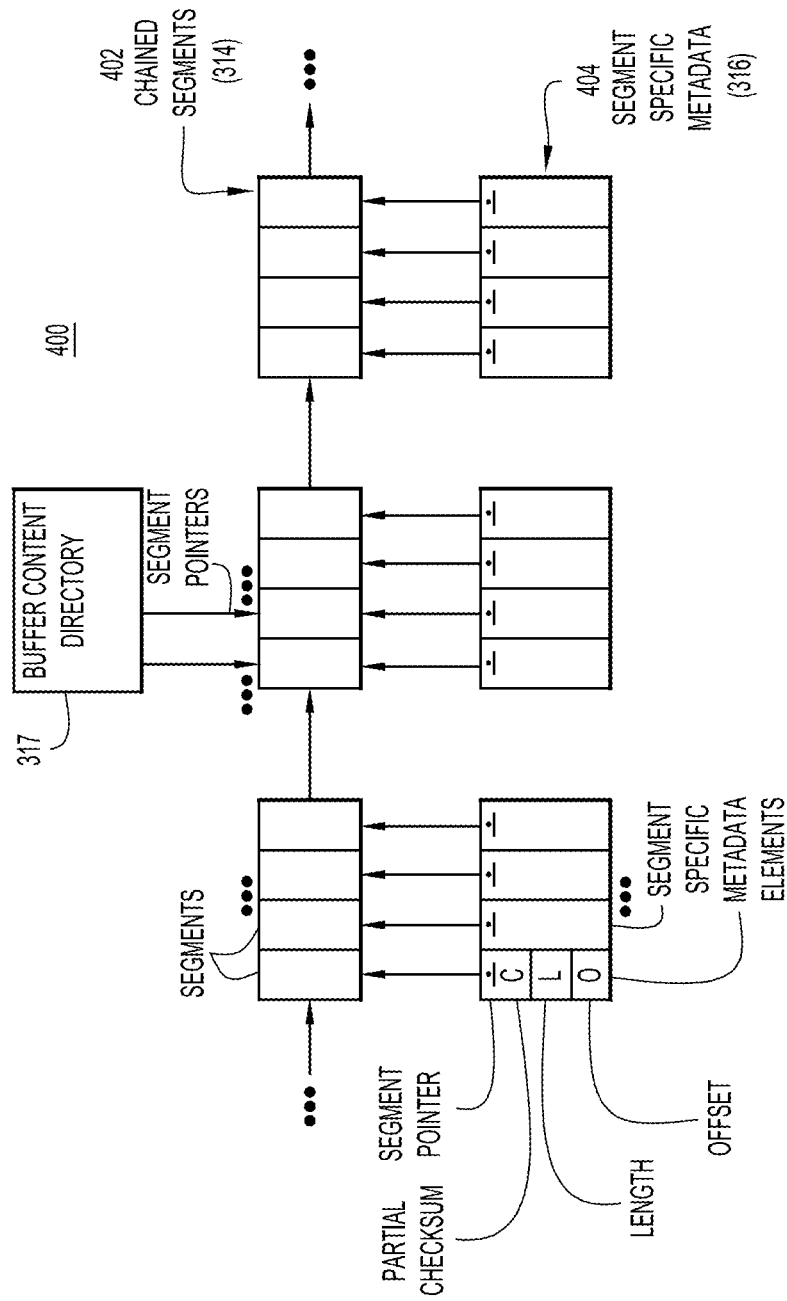
FIG. 4A is an illustration of various data structures in a main memory of a delivery node of the CDNs, according to an example embodiment.

With reference to FIG. 4A, there is an illustration of various data structures 400 in the main memory of delivery node 306. Data structures 400 include chained segments 402 in RX data buffer 314, segment-specific metadata 404 associated with chained segments 402 and that are stored in metadata buffer 316, and buffer content directory 317. Each element of segment-specific metadata 404 includes a segment pointer to the associated segment from which the metadata was derived, a partial checksum (C) that is a checksum of the contents of the associated segment, a length (L) of the associated segment, and an offset (0) of the associated segment. Buffer content directory 317 includes a respective pointer to and a respective identifier of each segment in chained segments 402.

Figure 4B:
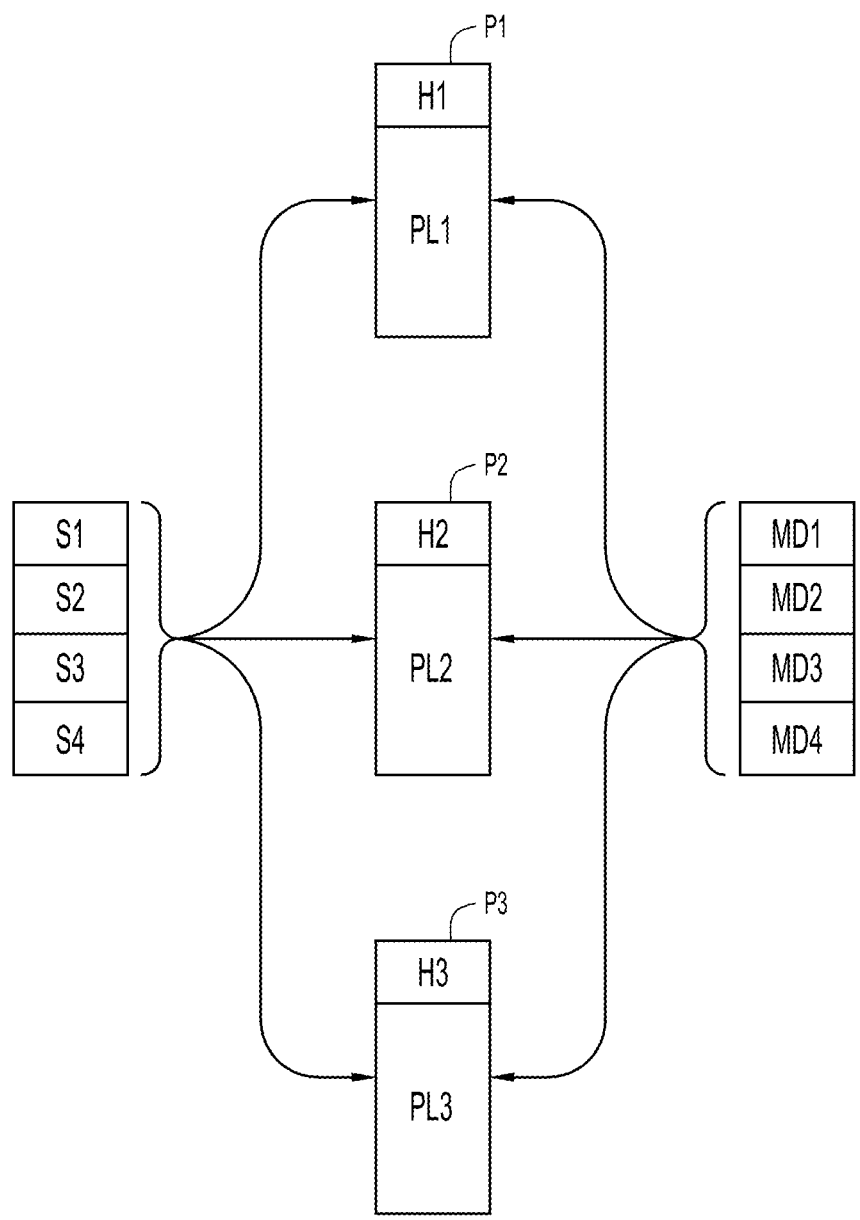
FIG. 4B is an illustration of re-use of content segments and their associated segment-specific metadata across multiple client-specific data packets, according to an example embodiment.

With reference to FIG. 4B, there is an illustration of re-use of segments and their associated segment-specific metadata across multiple client-specific data packets. As shown in FIG. 4B, client specific-data packets P1, P2, and P3 include headers/payloads H1/PL1, H2/PL2, and H3/PL3, respectively. The payloads PL1-PL3 each include the same segments S1-S4 from RX data buffer 314. In addition, headers H1-H3 each include contributions from (or are derived based on) segment-specific metadata MD1-MD4 associated with segments S1-S4, respectively.

Figure 5:
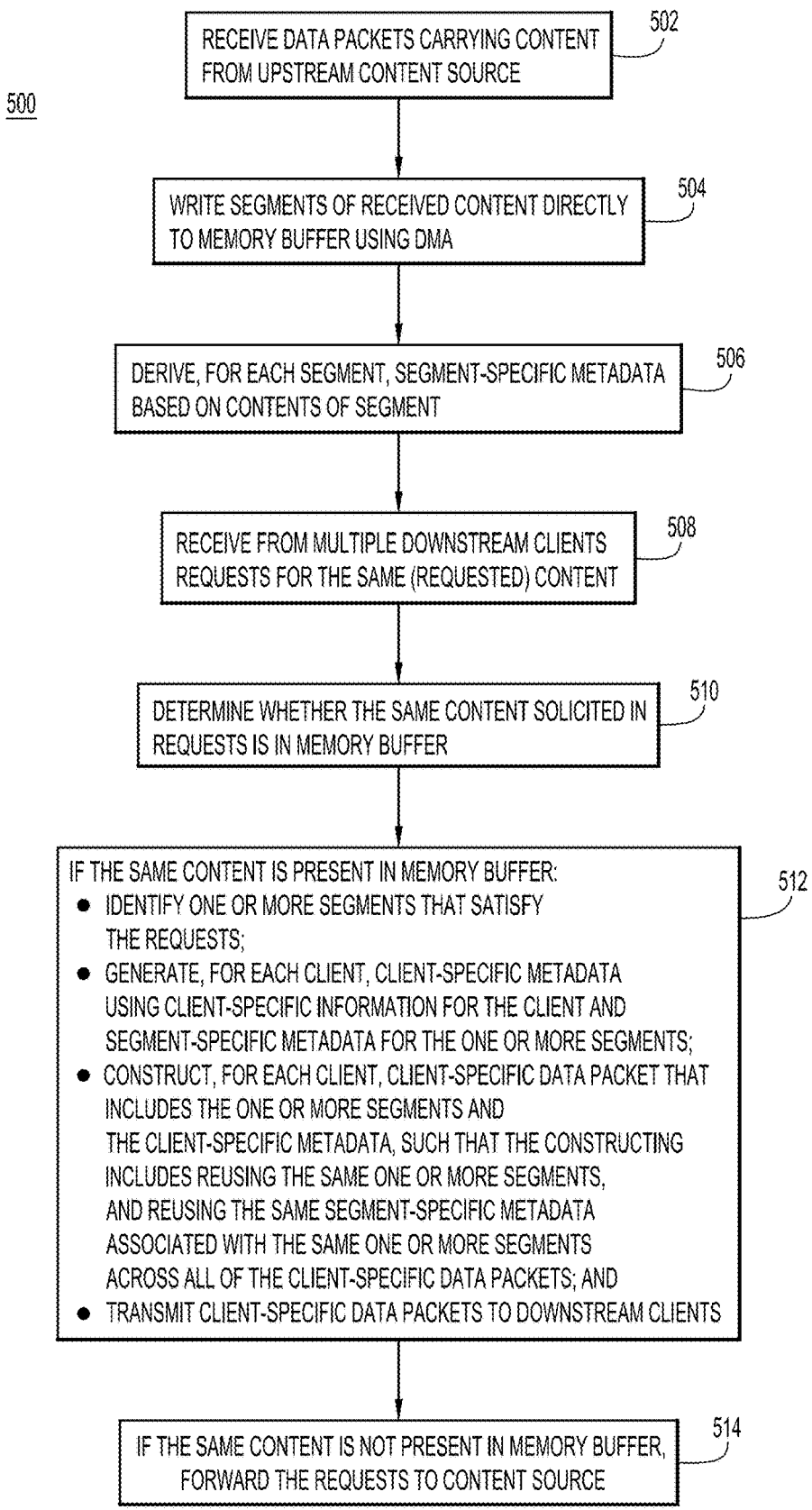
FIG. 5 is a flowchart of a method of data/content pipelining and replication performed by the delivery node, according to an example embodiment.

With reference to FIG. 5, there is a flowchart of an example method 500 of data/content pipelining and replication performed by delivery node 306. Operations of method 500 include various operations described above in connection with FIG. 3.

At 502, delivery node 306 receives data packets carrying content from an upstream source of content (e.g., content source 306). In an example, each data packet includes one or more communication protocol headers and a payload containing the content.

At 504, delivery node 306 writes segments of the received content directly to a memory buffer (e.g., to chained buffers of RX data buffer 314) of a memory using DMA data transfers.

At 506, delivery node 306 derives, for each segment, respective segment-specific metadata associated with the segment based on contents of the segment, and stores the respective segment-specific metadata in the memory. The segment-specific metadata may include a partial checksum, a segment length, and a segment offset of the associated segment.

At 508, delivery node 306 receives from multiple downstream client devices (e.g., client devices 104) respective requests for the same content. Each request includes an identifier of the same content and client-specific information associated with the downstream client device that originated the request. Delivery node 306 may also receive requests from the client devices that do not all identify the same content.

At 510, responsive to the requests, delivery node 306 determines whether the same content solicited in the requests is present in the memory buffer.

At 512, if the same content is present in the memory buffer, delivery node 306:
  a. Identifies in the memory buffer one or more segments that satisfy the requests, and accesses the one or more segments, as identified;
  b. Generates, for each client, client-specific metadata (e.g., client-specific protocol headers) using the client-specific information for the client and the segment-specific metadata for the one or more segments (derived at 506);
  c. Constructs, for each client, a client-specific data packet that includes the one or more segments and the client-specific metadata, such that the constructing includes reusing the same segment-specific metadata associated with the one or more segments and the same one or more segments across all of the client-specific data packets (which advantageously avoids re-deriving the associated segment specific metadata and avoids copying the one or more segments). Reuse of both the segment-specific metadata and the one or more segments may rely on pointers for access to the metadata and the segments to avoid copying of that information); and
  d. Transmits the client-specific data packets to the downstream (requesting) client devices.

At 514, if the same content is not present in the memory buffer, delivery node 306 sends to the content source the requests for the same content.

With reference to FIG. 6, there is depicted a hardware block diagram of delivery node 306, according to an embodiment. Delivery node 306 includes a network interface unit (NIU) 605 (e.g., a network interface card or multiple network interface cards) configured to enable the delivery node to send messages to and receive messages from a communication network. NIU 605 may include, for example, an Ethernet card having a connection port that enables communication over the communication network via the connection port. In a wireless embodiment, NIU 605 includes a wireless transceiver and an antenna to transmit and receive wireless communication signals to and from the network. In an NVMe embodiment, NIU 605 is replaced with a PCIe bus controller to enable communications with NVMe compatible disks over a PCIe bus. Thus, NIU 605 encompasses upstream device interface 310 and downstream device interface 312 of delivery node 306.

Delivery node 306 includes one or more processors 610 (e.g., processor 307 in FIG. 3) that execute software stored in memory 620. Processor(s) 610 include, for example, one or more microprocessors and/or microcontrollers. To this end, the memory 620 stores instructions for software stored in the memory that are executed by processor(s) 610 to perform the methods described herein.

Memory 620 may comprise read only memory (ROM), random access memory (RAM), magnetic disk storage media devices, optical storage media devices, flash memory devices, electrical, optical, or other physical/tangible memory storage devices. Thus, in general, the memory 620 may comprise one or more tangible (non-transitory) computer readable storage media (e.g., a memory device) encoded with software comprising computer executable instructions and when the software is executed (by the processor(s) 610) it is operable to perform the operations described herein. Memory 620 may store control logic 625 to perform the above described operations described in connection with FIGS. 3-5. Control logic 625 may also include logic to implement protocol layers 311 and 313.

In addition, memory 620 stores data 650 used and generated by the processor 610 when executing the logic described above. For example, memory 620 may include RX data buffer 314, metadata buffer 316, buffer content directory 317, data buffers to store client-specific metadata, and the transmit (TX) data buffer used to store client-specific data packets prior to them being transmitted to client devices 104.

SUMMARY

Embodiments presented herein use an efficient technique to deliver common content (retrieved using virtually any upstream protocol) to multiple clients (using virtually any downstream protocol). The embodiments include the following operations that increase efficiencies:
  a. Retrieving the data/content from upstream devices/drivers/storages (over HTTP, serial advanced technology attachment (SATA), Ceph open source software, and so on). The data is typically received as "data buffers" (i.e., content segments stored in a receive data buffer).
  b. Protecting and keeping the data buffers, as well as associated data buffer specific metadata and making the data buffers and metadata accessible to downstream devices.
  c. Delivering the content (of the data buffers) to multiple clients while re-using the same data buffers, appended with protocol specific headers.

A typical example would be to send data received over a parent HTTP connection, to multiple client HTTP connections, as follows:
  a. Data buffers received from the parent TCP connection containing content data are kept in memory.
  b. Data partial checksums are computed for the data buffer (derived from the received packet checksum), and stored as metadata for the data buffer.
  c. When a client HTTP connection is opened, it is processed normally up to the point where the data buffer must be transmitted.
  d. Data buffers that were stored in memory are reused when transmitting the given data to clients over TCP. This is typically done by using chained data buffers, which is a technique supported by most hardware, and enables reusing given data buffers located in DMA multiples times, while, simultaneously, only prepending different IP/TCP headers in front of each individual packet (The checksum is efficiently computed based on partial checksums computed before).
  e. Recycle the data buffers once the data does not need to be kept in memory anymore.

Another typical example would be to send data received from a PCI NVMe device (or other storage devices) to multiple client HTTP connections, as follows:
  a. Data buffers are received, through the PCI bus, directly in memory areas which can be used by network devices (using DMA).
  b. Data buffers are prepared in order to be usable by the networking devices (e.g. compute partial checksum, associate metadata, and the like).
  c. Perform the same steps as in the previous example to transmit the same data multiple times through HTTP.

A key factor that makes this optimization possible is the ability to reuse a given packet (data) buffer multiple times, and simultaneously, without memory copies. The same technique is, for instance, used when performing multicast replication, the point being to bring these improvements to the session layer and above.

In some cases, the data buffers may be received over a large maximum transmission unit (MTU) link. One step might include reducing the size of such data buffers to values that comply with the client side MTU. Another efficient technique would be to send large TCP packets and then rely on hardware TCP offload.

Identical approaches can obviously be applied to various situations, as follows:
  a. Various upstream network protocols, such as HTTP, Ceph, the File Transfer Protocol (FTP), and the like, whether they are running on top of TCP, QUIC, or any other transport protocol.
  b. When the content is retrieved from storage, low level driver packets (e.g. SATA) may be reused, or the content may be pre-packetized in advance and copied into network buffers.
  c. Various downstream network protocols such as HTTP, FTP, and the like, whether they are running on top of TCP, QUIC, or any other transport protocol.

In further summary, embodiments presented herein use the following techniques in order to provide efficient delivery of retrieved files to many clients:
  a. Retrieval of data from various parent networking or storage protocols and in-memory storage of such data in a pre-packetized fashion.
  b. Association of metadata with each data buffer, such as partial checksums and data information, such as to optimize individual packet transmission and reduce per-client state.
  c. Chaining of multiple client-specific header with the data buffers such as to transmit data over the client protocol without involving any per-client memory copy.

The embodiments presented herein improve the performance of content sources, such as servers, when delivering a reduced set of content to a large number of clients. The embodiments are especially applicable (though not limited) to content whose diversity is sufficiently small so that it can remain in a memory buffer. The embodiments allow for zero-copy file delivery, in the sense that the data itself is only pipelined from the parent protocol/devices to the client-side protocols/devices. The embodiments result in an order of magnitude increase of the data throughput achieved by servers for the same cost as compared with typical file servers. Downstream and upstream protocols are unchanged, meaning that the client and origin server are not modified. Embodiments presented herein effectively collapses network layers between upstream and downstream protocols and leverage modern memory sizes and speeds to dramatically increase content server and delivery node efficiency and traffic delivery volume. Given that video content represents approximately 75% of all Internet traffic, such improvements offer substantial advantages in terms of speed and cost relative to conventional solutions.

In summary, in one form, a method is provided comprising: at a content delivery node: receiving content from an upstream source of content; writing segments of the received content directly to a memory buffer of a memory using direct memory access (DMA) data transfers; deriving, for each segment, respective segment-specific metadata based on contents of the segment, and storing the respective segment-specific metadata in the memory; and receiving from multiple downstream client devices respective requests for the same content, wherein each request includes client-specific information associated with the downstream client device that originated the request, and responsive to the requests: identifying in the memory buffer one or more segments that satisfy the requests; generating, for each client, client-specific metadata using the client-specific information for the client device and the segment-specific metadata for the one or more segments; and constructing, for each client, a client-specific data packet that includes the one or more segments and the client-specific metadata; and transmitting the client-specific data packets to the downstream client devices.

In summary, in another form, an apparatus is provided comprising: a network interface unit (NIU), a memory coupled to the network interface unit, and a processor of a content delivery node coupled to the network interface unit; wherein the NIU is configured to receive content from an upstream source of content and write segments of the received content directly to a memory buffer of the memory using direct memory access (DMA) data transfers; wherein the processor is configured to: derive, for each segment, respective segment-specific metadata based on contents of the segment, and storing the respective segment-specific metadata in the memory; and receive from multiple downstream client devices respective requests for the same content, wherein each request includes client-specific information associated with the downstream client device that originated the request, and responsive to the requests: identify in the memory buffer one or more segments that satisfy the requests; generate, for each client, client-specific metadata using the client-specific information for the client device and the segment-specific metadata for the one or more segments; and construct, for each client, a client-specific data packet that includes the one or more segments and the client-specific metadata; and wherein the NIU is configured to transmit the client-specific data packets to the downstream client devices.

In summary, in yet another form, a non-transitory computer readable storage medium is provided. The computer readable storage medium is encoded with instructions that, when executed by a processor of a content deliver node including a network interface unit configured to receive content from an upstream source of content and write the segments of the received content directly to a memory buffer of a memory accessible to the processor using direct memory access (DMA) data transfers, cause the processor to perform: deriving, for each segment, respective segment-specific metadata based on contents of the segment, and storing the respective segment-specific metadata in the memory; and receiving from multiple downstream client devices respective requests for the same content, wherein each request includes client-specific information associated with the downstream client device that originated the request, and responsive to the requests: identifying in the memory buffer one or more segments that satisfy the requests; generating, for each client, client-specific metadata using the client-specific information for the client device and the segment-specific metadata for the one or more segments; and constructing, for each client, a client-specific data packet that includes the one or more segments and the client-specific metadata; and cause the NIU to perform transmitting the client-specific data packets to the downstream client devices.

The above description is intended by way of example only. Various modifications and structural changes may be made therein without departing from the scope of the concepts described herein and within the scope and range of equivalents of the claims.

What is claimed is:

1. A method comprising:
at a content delivery node:
receiving content from an upstream source of content;
writing segments of the received content directly to a memory buffer of a memory using direct memory access (DMA) data transfers;
deriving, for each segment, respective segment-specific metadata based on contents of the segment, and storing the respective segment-specific metadata in the memory; and
receiving from multiple downstream client devices respective requests for the same content, wherein each request includes client-specific information associated with the client device that originated the request, and responsive to the requests:
identifying in the memory buffer one or more segments that satisfy the requests;
generating, for each client device, client-specific metadata using the client-specific information for the client device and the respective segment-specific metadata for the one or more segments; and
constructing, for each client device, a client-specific data packet that includes the one or more segments and the client-specific metadata for the one or more segments; and
transmitting the client-specific data packets to the client devices.

2. The method of claim 1, wherein the constructing, for each client device, the client-specific data packet includes reusing the same one or more segments across all of the client-specific data packets and reusing the same respective segment-specific metadata associated with the one or more segments across all of the client-specific data packets so as to avoid re-deriving the respective segment-specific metadata.

3. The method of claim 1, wherein the deriving, for each segment, the respective segment-specific metadata includes computing as part of the respective segment-specific metadata a segment-specific checksum based on the contents of the segment.

4. The method of claim 3, wherein the generating, for each client device, the client-specific metadata includes:
constructing a protocol header including the client-specific information; and computing a packet checksum over the protocol header and the one or more segments using one or more segment-specific checksums for the one or more segments to avoid re-computing segment-specific checksums of the one or more segments when computing the packet checksum.

5. The method of claim 4, wherein:
the deriving, for each segment, the respective segment-specific metadata further includes determining a segment length and a segment offset for the segment; and
the generating, for each client device, the client-specific metadata further includes constructing the protocol header to further include the segment lengths and the segment offsets of the one or more segments.

6. The method of claim 1, further comprising, responsive to the requests:
determining whether the same content is present in the memory buffer;
if the same content is not present, sending a request for the same content to the upstream source of content and then receiving the same content from the upstream source of content; and
if the same content is present, performing the identifying, the generating, the constructing, and the transmitting.

7. The method of claim 1, wherein:
the upstream source of content includes one or more non-volatile memory express (NVMe) compatible disks that store the content:
the receiving the content includes receiving the content from the NVMe compatible disks over a peripheral component interconnect (PCI) bus connected between the NVMe compatible disks and the content delivery node; and
the transmitting includes transmitting each client-specific data packet using Hypertext Transfer Protocol (HTTP) over Transmission Control Protocol (TCP)/Internet Protocol (IP).

8. The method of claim 1, wherein:
the receiving the requests includes receiving Hypertext Transfer Protocol (HTTP) requests over Transmission Control Protocol (TCP)/Internet Protocol (IP); and
the transmitting includes transmitting each client: specific data packet using HTTP over the TCP/IP.

9. The method of claim 1, wherein the identifying, the generating, and the constructing are performed without copying the one or more segments in the memory buffer to the memory.

10. A apparatus comprising:
a network interface unit (NIU), a memory coupled to the network interface unit, and a processor of a content delivery node coupled to the network interface unit;
wherein the NIU is configured to receive content from an upstream source of content and write segments of the received content directly to a memory buffer of the memory using direct memory access (DMA) data transfers;
wherein the processor is configured to:
derive, for each segment, respective segment-specific metadata based on contents of the segment, and storing the respective segment-specific metadata in the memory; and
receive from multiple downstream client devices respective requests for the same content, wherein each request includes client-specific information associated with the client device that originated the request, and responsive to the requests:
identify in the memory buffer one or more segments that satisfy the requests;
generate, for each client device, client-specific metadata using the client-specific information for the client device and the respective segment-specific metadata for the one or more segments; and
construct, for each client device, a client-specific data packet that includes the one or more segments and the client-specific metadata for the one or more segments; and
wherein the NIU is configured to transmit the client-specific data packets to the client devices.

11. The apparatus of claim 10, wherein the processor is configured to construct, for each client device, the client-specific data packet by reusing the same one or more segments across all of the client-specific data packets and reusing the same respective segment-specific metadata associated with the one or more segments across all of the client-specific data packets so as to avoid re-deriving the respective segment-specific metadata.

12. The apparatus of claim 10, wherein the processor is configured to derive, for each segment, the respective segment-specific metadata by computing as part of the respective segment-specific metadata a segment-specific checksum based on the contents of the segment.

13. The apparatus of claim 12, wherein the processor is configured to generate, for each client device, the client-specific metadata by:
constructing a protocol header including the client-specific information; and
computing a packet checksum over the protocol header and the one or more segments using one or more segment-specific checksums for the one or more segments to avoid re-computing segment-specific checksums of the one or more segments when computing the packet checksum.

14. The apparatus of claim 13, wherein:
the processor is further configured to derive, for each segment, the respective segment-specific metadata by determining a segment length and a segment offset for the segment; and
the processor is further configured to generate, for each client device, the client-specific metadata further by constructing the protocol header to further include the segment lengths and the segment offsets of the one or more segments.

15. The apparatus of claim 10, wherein the processor is further configured to, responsive to the requests:
determine whether the same content is present in the memory buffer;
if the same content is not present, send a request for the same content to the upstream source of content and then receiving the same content from the upstream source of content; and
if the same content is present, perform the operations to identify, generate, and construct.

16. The apparatus of claim 10, wherein the operations to identify, generate, and construct operations are performed without performing a copy of the one or more segments in the memory buffer to the memory.

17. A non-transitory computer readable medium encoded with instructions that, when executed by a processor of a content deliver node including a network interface unit (NIU) configured to receive content from an upstream source of content and write segments of the received content directly to a memory buffer of a memory accessible to the processor using direct memory access (DMA) data transfers, cause the processor to perform:

deriving, for each segment, respective segment-specific metadata based on contents of the segment, and storing the respective segment-specific metadata in the memory; and receiving from multiple downstream client devices respective requests for the same content, wherein each request includes client-specific information associated with the client device that originated the request, and responsive to the requests:

identifying in the memory buffer one or more segments that satisfy the requests;

generating, for each client device, client-specific metadata using the client-specific information for the client device and the respective segment-specific metadata for the one or more segments; and constructing, for each client device, a client-specific data packet that includes the one or more segments and the client-specific metadata for the one or more segments; and cause the NIU to perform transmitting the client-specific data packets to the client devices.

18. The non-transitory computer readable medium of claim 17, wherein the instructions to cause the processor to perform the constructing, for each client device, the client-specific data packet include instructions to cause the processor to perform reusing the same one or more segments across all of the client-specific data packets and reusing the same respective segment-specific metadata associated with the one or more segments across all of the client-specific data packets so as to avoid re-deriving the respective segment-specific metadata.

19. The non-transitory computer readable medium of claim 17, wherein the instructions to cause the processor to perform the deriving, for each segment, the respective segment-specific metadata include instructions to cause the processor to perform computing as part of the respective segment-specific metadata a segment-specific checksum based on the contents of the segment.

20. The non-transitory computer readable medium of claim 19, wherein the instructions to cause the processor to perform the generating, for each client device, the client-specific metadata include instructions to cause the processor to perform:

constructing a protocol header including the client-specific information; and computing a packet checksum over the protocol header and the one or more segments using one or more segment-specific checksums for the one or more segments to avoid re-computing segment-specific checksums of the one or more segments when computing the packet checksum.

* * * * *

UNITED STATES PATENT AND TRADEMARK OFFICE
CERTIFICATE OF CORRECTION

PATENT NO. : 10,536,561 B2  
APPLICATION NO. : 15/784361  
DATED : January 14, 2020  
INVENTOR(S) : Pierre Pfister et al.

Page 1 of 1

It is certified that error appears in the above-identified patent and that said Letters Patent is hereby corrected as shown below:

In the Claims

Claim 8, Column 13, Line 43, please replace "client: specific" with --client-specific--

Signed and Sealed this
Twenty-fifth Day of February, 2020

Andrei Iancu
*Director of the United States Patent and Trademark Office*